July 5, 1927.
E. H. BELDEN
LUBRICATING SYSTEM
Filed April 21, 1921
1,634,820
2 Sheets-Sheet 1
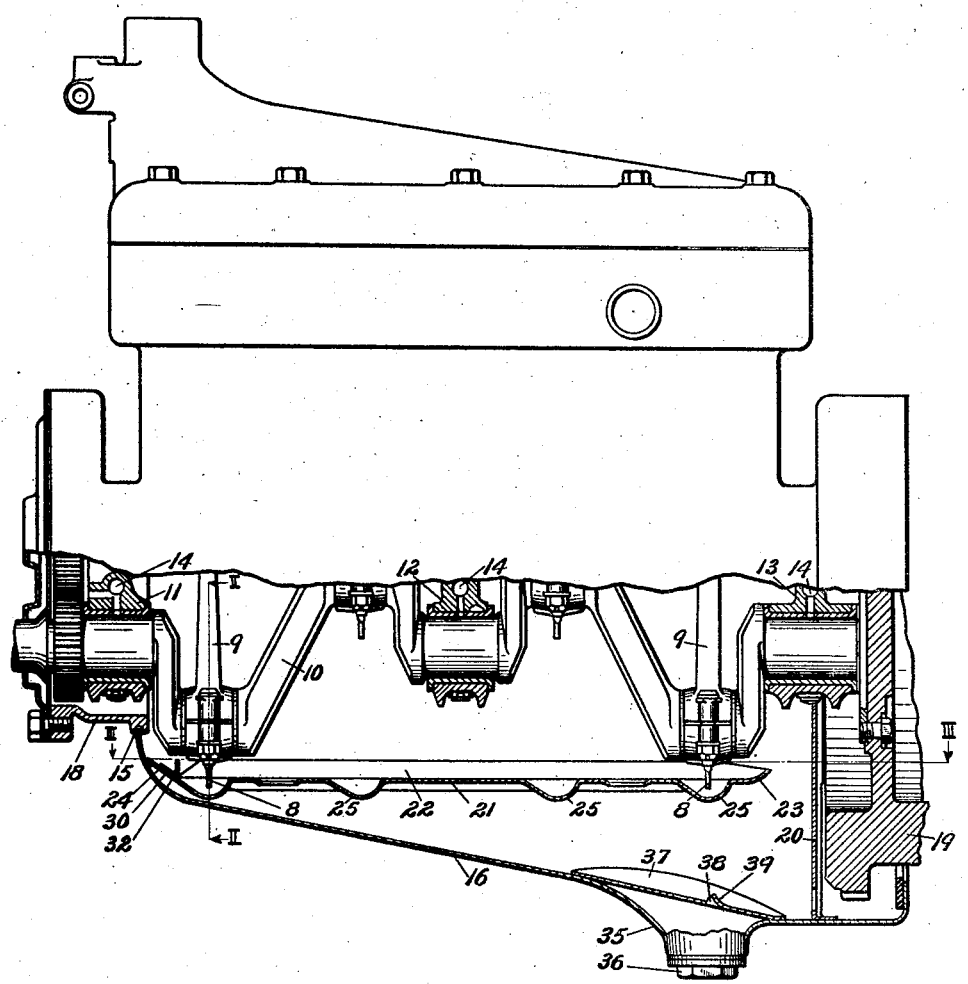
Fig. I
INVENTOR.
Edward H. Belden
BY
ATTORNEYS July 5, 1927.
E. H. BELDEN
LUBRICATING SYSTEM
Filed April 21, 1921
1,634,820
2 Sheets-Sheet 2
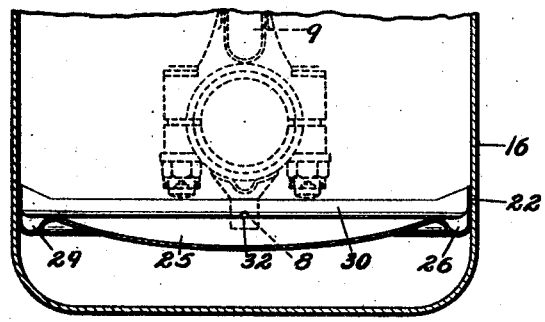
Fig. I
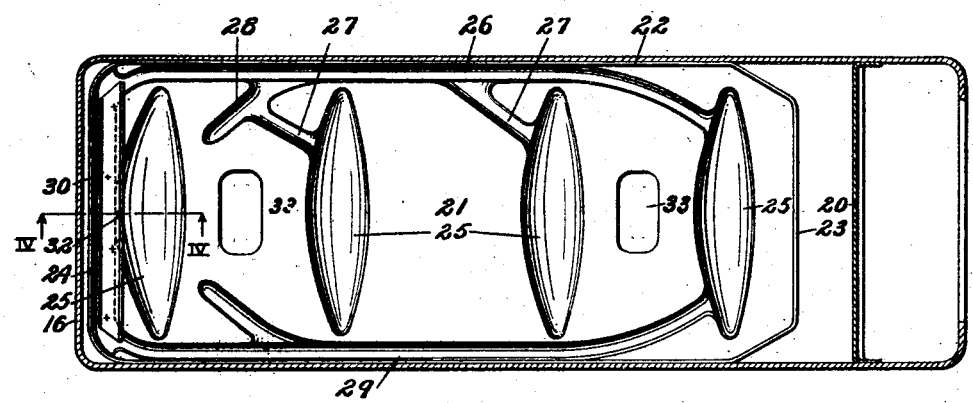
Fig. III
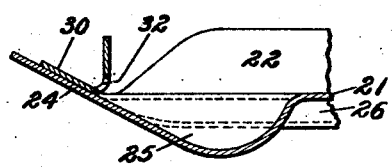
Fig. IV
INVENTOR.
Edward H. Belden
BY Chester W. Braselton
Harry W. Lindsey Jr.
ATTORNEYS.

Patented July 5, 1927.

1,634,820

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

LUBRICATING SYSTEM.

Application filed April 21, 1921. Serial No. 463,185.

This invention relates to lubricating systems for internal combustion engines and the like, and more particularly to novel improvements in lubricating systems of the well-known splash type in which the lower ends of the connecting rods splash or throw the oil to lubricate various moving parts of the engine.

It is the usual practice to provide in internal combustion engines, having the splash or wipe system of lubrication, a pan or tray secured to the lower half or bottom portion of the crank case of the engine, and to provide the pan or tray with a series of depressions which, in effect, form oil troughs or receptacles, there being one trough for each connecting rod, so that the wipers or fingers on the lower ends of the connecting rods dip into the oil in the troughs to splash or throw the oil from the troughs and thus effect lubrication of the pistons, the bearings for the connecting rods, as well as other moving parts of the engine.

The principal object of the present invention is to provide improved and novel means for effecting a proper and substantially equal distribution of the lubricant to the various receptacles or troughs from which the lubricant is splashed up by the lower ends of the connecting rods or the wipers secured thereto to perform that purpose.

Another object of the invention is to interconnect certain of such oil troughs or receptacles to assure the desired and proper distribution of the oil to such receptacles.

A still further object of the invention is to equip the pan or tray, equipped with the individual troughs from which the oil is splashed, with a deflecting member so that as oil drains from a bearing, part of it is deflected or directed to grooves in the pan for the purpose of distributing the oil to certain of such troughs.

It is also an object of the invention to provide such deflecting member with an opening through which part of the oil, dripping from the crankshaft bearing, is delivered to the individual trough below the connecting rod adjacent the bearing.

It is an object of the invention to form in the pan or tray a groove or channel communicating or connecting certain of the supplementary oil receptacles, and a second channel or groove only connected to the supplementary receptacle most remote from the deflecting member or plate, so that part of the oil flowing from the deflecting plate is conveyed to the intercommunicating channel and part to the channel only connected to the receptacle most remote from the deflecting plate for the purpose of feeding more oil, draining from the bearing, to the latter receptacle than to each of the other receptacles in communication with the interconnecting channel.

Yet another object of the invention is to provide novel means for causing sediment and foreign particles in the lubricant to settle or be deposited in a sediment chamber formed in the main oil reservoir or case.

With these and other objects in view, the invention comprises certain improved forms of construction, arrangement of parts, and combinations of elements which will be hereinafter more fully described and claimed, it being understood that the present showing is intended to illustrate one form of the invention, which is susceptible of various modifications to suit special or varying conditions, and it will be further understood that the terms which I have used are merely descriptive and not limiting and that it is my intention to include any and all modifications which come within the scope of the invention, as defined by the appended claims.

In the accompanying drawings I have illustrated one embodiment of the invention, in which:

Figure I is a side view of an internal combustion engine with the lower half in longitudinal vertical section to disclose the structure embodying the present invention to view.

Figure II is a detail transverse section taken on the line II—II of Figure I.

Figure III is a horizontal section taken through the lower half of the crank case, as on the line III—III of Fig. I, to show the supplemental oil pan or tray in top plan elevation.

Figure IV is a fragmental section taken through the forward end of the supplemental oil pan or tray, as on the line IV—IV of Figure III.

Referring to Figure I, it will be observed that a conventional form of engine with the crankshaft 10 mounted in the bearings 11, 12 and 13, is shown, it being obvious however that the invention may be applied to any type or kind of multi-cylinder internal combustion engine or the like. Lubricant may be supplied or fed to the crankshaft bearings through passages or ducts 14, either by a force feed system, or by a gravity feed system, as desired, the lubricating system for feeding oil to the crankshaft bearings not being disclosed in the drawings, as any desired system may be employed for this purpose. Wipers or fingers 8, the function of which will be described more fully hereafter, are secured to the lower ends of connecting rods 9 through which the pistons are reciprocated by the crankshaft.

The main reservoir for the lubricating oil for the engine is formed by the lower part 16 of the crank case, this lower part of the crank case being secured to the upper part by the usual means (not shown). The lubricating oil is drawn or carried from this main reservoir by any desired system or means, as above mentioned, in order to lubricate the crankshaft bearings through the conduits 14. It will be noted that the forward end of the crank case part 16 engages in a groove 15 formed in the underside of a portion 18 of the upper part of the crank case, this portion being positioned under the front bearing 14 of the crankshaft. The fly-wheel 19 of the engine is housed between the rear end of the crank case part 16 and a vertical partition 20 secured at its lower edge in any desired manner to the crank case.

A supplementary oil pan or tray is positioned under the crankshaft of the engine so that the wiping or splashing devices 8, secured to the lower ends of the connecting rods 9, wipe or splash the oil from supplementary receptacles or troughs formed in the pan. This supplementary pan 21 is formed of sheet metal and is stamped by suitable means to give it the required size, shape and contour. It is provided at its longitudinal sides with vertical flanges 22 through which the pan is rigidly mounted in position in the crank case 16 by spot-welding, rivets or other suitable means. The rear end of the pan 16 is curved slightly upward to form the flange or ledge 23, while the forward end is inclined upwardly and forwardly to form the flange 24, which contacts with the forward end of the crank case 16. Under each connecting rod a depression, oval in plan view, is formed in the tray or pan 21 to form a trough or receptacle 25. Extending along the left hand side of the tray 21 and formed on one side by the flange 22, is a groove or channel 26 which, at its rear end, terminates in the rearmost trough 25, while the forward end terminates adjacent or under the end of an angle plate or bar 30, which is spot-welded or otherwise secured to the forward flange 24 of the tray 21. The two intermediate troughs 25 are connected by branch channels 27 to the groove 26, the channel 27 for the second trough 25 (counting from the front of the engine) being provided with a projecting portion 28. A channel or groove 29, which is similar to groove 26, extends along the right hand side of the pan 21, but the groove 29 is not connected to the intermediate receptacles 25, being only connected at its rear end to the rear receptacle. It will be observed by referring to Figures II and III that the grooves or channels 26 and 29 are of uniform depth and more shallow than the receptacles 25. The plate 30, at its middle, is provided with an opening or hole 32 which is immediately above the forward middle end of the front receptacle 25. Intermediate the first and second and the third and fourth receptacles 25, are openings 33 formed in the pan 21 to permit the excess oil deposited on the pan to escape and drain into the main oil reservoir 16.

From the above description it will be clear that oil is carried or drawn from the main oil reservoir and supplied to the bearings of the crankshaft through the conduits 14. The oil which drains from the middle bearing 12, drips on to the pan 21 and, as the portion of the pan between the intermediate receptacles 25 is flat, this oil is free to flow in any direction, depending upon the inclination of the engine, it being directly distributed in this way, more or less equally, to the grooves 26 and 29 and the intermediate receptacles 25. The oil from the front conduit 14 is delivered not only to the front main bearing but also has a free exit to the timing gears as shown clearly at the left of Figure I, so that a much greater quantity is delivered from the front conduit 14 than from the intermediate and rear conduits. It flows down on the portion 18 of the crank case and then on to the forward flange 24 of the pan 21 and the deflecting angle plate 30. Part of the oil draining from this front bearing is directed or distributed by the deflecting plate 30 to the channels 26 and 29, while the remainder escapes through the opening 32 in the angle plate 30 and runs into the forward receptacle 25. The oil deflected to the channel 26 by the deflecting plate 30, flows from the channel to the three receptacles 25 with which it communicates, while the oil conveyed to the channel 29 by the deflecting plate, flows only to the rear receptacle 25.

The wipers or splasher fingers 8, secured to the lower ends of the connecting rods, dip or wipe into the oil contained in the receptacles 25, whereby the oil is splashed to lubricate the connecting rod bearings and the cylinder walls, as is well understood in the art. The oil which is deposited on the walls of the crank case by this splashing operation or action, runs or drains into the grooves or channels 26 and 29 and is conveyed thereby to the receptacles to which they are connected. The excess oil deposited on the pan 21 escapes through the openings 33 in the pan and drips into the main oil supply chamber.

It will be observed that the groove 26, connected to three of the troughs 25, is formed in that side of the oil pan towards which the wipers or fingers 8 move during the lower half of their revolution, a larger quantity of oil being splashed or deposited on that side of the crank case, than on the other side. It will also be seen that the front receptacle 25 does not communicate with either of the channels 26 or 29, it being supplied with sufficient oil from the front crankshaft bearing through the opening 32 in the angle plate. The oil from the rear bearing 13 for the crankshaft does not drip or drain onto the pan 21, and therefore in order to insure the proper distribution of the lubricant to the rear receptacle, the channel 29 is provided to convey or transmit part of the oil, which drips on to the deflecting plate, and the oil, which is deposited on the left side of the crank case and feeds into this channel, to this rear receptacle. By this novel arrangement of the intercommunicating channels or grooves and deflecting plate, a proper and even distribution of the lubricant to all of the receptacles 25 is effected in a most simple and efficient manner.

The crank case 16 is formed to provide a sediment chamber 35 which is closed by the screw plug 36 in the usual manner, this sediment chamber being provided to catch and retain any sediment or foreign particles which separates or settles out of the oil, the plug 36, of course, being removable to drain the oil out of the crank case. Secured over the top of the sediment chamber 35 by spot-welding or other means, is a sheet metal disc or plate 37 having a slot 38 and a lip or projection 39, the lip being stamped upwardly in the plate to form the slot. It will be observed that as the sediment settles on the bottom of the crank case 16, it will move rearwardly by gravity down the inclined bottom until it gets to the slot 38, whereupon it will drop or settle into the sediment chamber 35 and in this way be prevented from being again carried by the oil to the parts to be lubricated.

While I have illustrated and described one embodiment of my invention, it will be obvious that different modifications thereof may be constructed to suit different conditions, and I wish therefore not to be restricted or limited to the precise embodiment, shown except in so far as the same is limited by the appended claims.

What I claim as new and desire to secure by Letters Patent, is:—

1. As an article of manufacture, an oil pan for a multi-cylinder engine provided with receptacles, one for each connecting rod, and also with a groove or channel extending along each side of the pan, the groove on one side being connected to a plurality of receptacles and the groove on the other side being connected to a lesser number of said receptacles.

2. As an article of manufacture, an oil pan for a multi-cylinder engine constructed of sheet metal and stamped to provide oil receptacles, one for each connecting rod, and also two grooves or channels, one groove being connected to a plurality of said receptacles, and another groove to but one of said receptacles.

3. As an article of manufacture, a sheet metal oil pan for a multi-cylinder engine stamped to form oil receptacles, one for each connecting rod of the engine, and also grooves or channels of less depth than the receptacles and extending along the longitudinal sides of the pan, the groove on one side being connected to a plurality of said receptacles, and the groove on the other side being connected to but one receptacle.

4. As an article of manufacture, an oil pan for a multi-cylinder engine provided with a plurality of receptacles, one for each connecting rod, and intercommunicating means between certain of said receptacles, and a deflecting plate secured to said pan and provided with an opening communicating with one of said receptacles.

5. As an article of manufacture, an oil pan for a multi-cylinder engine provided with a plurality of receptacles, one for each connecting rod, and intercommunicating means between certain of said receptacles, and a deflecting plate secured to said pan, communicating with said intercommunicating means, and provided with an opening communicating with one of said receptacles.

6. As an article of manufacture, an oil pan for a multi-cylinder engine provided with a plurality of oil receptacles, one for each connecting rod, interconnecting means between certain of said receptacles, and a deflecting plate provided with an opening communicating with one of said receptacles, not connected by said interconnecting means, said pan being also provided with a medium connected only to one of said receptacles connected by said interconnecting means, for conveying oil from said deflecting plate to said last mentioned receptacle.

7. As an article of manufacture, an oil pan for a multi-cylinder engine provided with a plurality of oil receptacles, one for each connecting rod, a channel interconnecting certain of said receptacles, a channel connected to only one of said interconnected receptacles, and a deflecting plate adapted to direct or convey oil to both of said channels.

8. As an article of manufacture, an oil pan for a multi-cylinder engine provided with a plurality of oil receptacles, one for each connecting rod, a channel interconnecting certain of said receptacles, a channel connected to only one of said interconnected receptacles, and a deflecting plate adapted to direct or convey oil to both of said channels and provided with an opening communicating with one of said receptacles not connected by said interconnecting channel.

9. In an internal combustion engine, the combination of a crankshaft, connecting rods, a bearing, an oil pan positioned under the shaft and provided with receptacles, one for each connecting rod, and with grooves or channels connected to certain of said receptacles, and a member for directing part of the oil draining from said bearing to said grooves and part directly to one of said receptacles.

10. In an internal combustion engine, the combination of connecting rods, and an oil rods, a bearing, an oil pan positioned under the shaft and provided with receptacles, one for each connecting rod, and grooves or channels connected to certain of said receptacles, and a member for deflecting part of the oil draining from said bearing to said grooves and provided with an opening communicating with one of said receptacles not connected to said grooves.

11. In an internal combustion engine, the combination of connecting rods, and an oil pan provided with oil receptacles, one for each connecting rod, and with two grooves along its sides, the groove on the side towards which the larger volume of oil is thrown being connected to a plurality of said receptacles, while the groove on the other side is connected to a lesser number of said receptacles.

12. In an internal combustion engine, the combination of a bearing, connecting rods, an oil pan provided with oil receptacles, one for each connecting rod, and with a groove along each side, the groove on the side towards which the larger volume of oil is thrown being connected to a plurality of said receptacles, while the groove on the other side is connected to but one of said receptacles, and a deflecting plate for deflecting part of the oil draining from said bearing to said grooves.

13. In an internal combustion engine, the combination of a bearing, connecting rods, an oil pan provided with oil receptacles, one for each connecting rod, and with two grooves one along each side, the groove on the side towards which the larger volume of oil is thrown being connected to a plurality of said receptacles, while the groove on the other side is connected to but one of said receptacles, and a deflecting plate for deflecting part of the oil draining from said bearing to said grooves and provided with an opening whereby part of the oil draining from the bearing is directed to one of said receptacles not connected to said grooves.

14. In an oil distributor for automobile engines, a sump having oil splash troughs therein, and a baffle extending across near the front end of said sump, means for delivering oil to the front of the baffle for distribution to the splash troughs.

15. In an oil distributor for automobile engines, a pan having oil splash troughs therein, a baffle extending across the pan near the front end thereof, means for delivering oil to the pan in front of the baffle and means for directing oil from the space in front of said baffle along a side of the pan past the trough next adjacent to the baffle and into troughs therebeyond.

In testimony whereof, I affix my signature.

EDWARD H. BELDEN.

Certificate of Correction.

Patent No. 1,634,820.                                        Granted July 5, 1927, to

EDWARD H. BELDEN.

It is hereby certified that error appears in the printed specification of the above-numbered patent requiring correction as follows: Page 4, line 26, claim 10, before the word "connecting" insert the words and comma *a crank shaft*, and lines 26 and 27, strike out the words and comma "and an oil rods,"; and that the said Letters Patent should be read with these corrections therein that the same may conform to the record of the case in the Patent Office.

Signed and sealed this 23d day of August, A. D. 1927.

[SEAL.]                                                               M. J. MOORE,
*Acting Commissioner of Patents.*